(12) United States Patent
Frank

(10) Patent No.: US 6,873,572 B1
(45) Date of Patent: Mar. 29, 2005

(54) LOW-FREQUENCY SONAR COUNTERMEASURE

(75) Inventor: Thomas A. Frank, Middletown, RI (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 10/839,449

(22) Filed: May 3, 2004

(51) Int. Cl.⁷ .............................................. H04R 23/00
(52) U.S. Cl. ...................... 367/174; 367/159; 367/171; 310/337; 181/120
(58) Field of Search .............................. 310/337; 367/1, 367/159, 163, 165, 166, 169, 174, 171; 181/113, 120

(56) References Cited

U.S. PATENT DOCUMENTS

| | | | |
|---|---|---|---|
| 3,961,305 A | * 6/1976 | Green | 367/171 |
| 4,183,008 A | * 1/1980 | Crist | 367/142 |
| 4,195,280 A | 3/1980 | Hillery | |
| 4,312,054 A | 1/1982 | Holand | |
| 4,514,834 A | 4/1985 | Hanson et al. | |
| 4,700,100 A | * 10/1987 | Congdon et al. | 310/337 |
| 5,062,089 A | 10/1991 | Willard et al. | |
| 5,175,708 A | 12/1992 | Dumestre, III | |
| 5,184,332 A | * 2/1993 | Butler | 367/174 |
| 6,275,448 B1 | 8/2001 | Kittower et al. | |

* cited by examiner

Primary Examiner—Ian J. Lobo
(74) Attorney, Agent, or Firm—James M. Kasischke; Jean-Paul A. Nasser; Michael F. Oglo

(57) ABSTRACT

A multi-port projector of acoustic energy in water includes a cylindrical hollow transducer having open annular ends. A thin, flexible member is secured to each annular end to extend across each opening to be displaced by the transducer, and the transducer and flexible members form an interior sealed from ambient water. A battery/electronics module is in the interior and is spaced from the transducer and flexible members to couple driving signals to the transducer for reciprocally displacing it and the flexible members in response to the driving signals. An inert liquid fills the interior around the module, and an open truss on each annular end exposes the flexible members to the ambient water. Cylindrical portions coaxially extending with the transducer on a common longitudinal axis are connected to the open trusses for projecting acoustic energy of lower frequency than conventional cylindrical transducers of similar size.

10 Claims, 1 Drawing Sheet

LOW-FREQUENCY SONAR COUNTERMEASURE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates generally to active sonar countermeasures. More particularly, this invention relates to a cost effective, cylindrically shaped acoustic countermeasure that lowers transmitted frequencies by one half as compared to contemporary transducers of the same size.

(2) Description of the Prior Art

Acoustic countermeasures are an integral part of undersea offensive and defensive operations, and compact transducers are routinely used as expendable acoustic sources. The expendable sources can project acoustic energy over bandwidths that are predetermined or limited by the dimensions of a source's cylindrical-shaped housing. The current state of the art expendable acoustic source is only capable of projecting acoustic energy at a low end frequency level that is approximately two times higher than the desired or optimum low frequency for successful countermeasure operations.

The size of a source's housing and hence the lowest operating frequencies are constrained by the dimensions of the launch or deployment systems in the submerged or surface vessel. Larger acoustic countermeasures would be capable of lower frequency operation, but larger sound sources are incompatible with existing systems used to deploy expendable acoustic countermeasures.

Thus, in accordance with this inventive concept, a need has been recognized in the state of the art for an expendable cylindrical-shaped acoustic source that is capable of operating at one half the present lowest operating frequency of a contemporary source of similar dimensions.

SUMMARY OF THE INVENTION

The first object of the invention is to provide a multi-port underwater projector of acoustic energy.

Another object is to provide a multi-port projector that is capable of projecting acoustic energy at about one half the lowest frequency of a contemporary source of similar size.

Another object is to provide a multi-port projector that is capable of projecting acoustic energy at about one half the lowest frequency of a contemporary source of similar size.

Another object is to provide a multi-port acoustic energy projector compatible with existing allotted spaces in a countermeasure device and capable of projecting acoustic energy at one half the lowest frequency of a similar sized contemporary source.

Another object is to provide a multi-port projector of acoustic energy having thin flexible members, such as membranes or thin plates at opposite ends of a cylindrical transducer.

Another object is to provide an acoustic projector having flexible members at opposite ends of a cylindrical transducer to fit into an existing allotted space in a countermeasure device and project acoustic energy.

Another object is to provide a cylinder-shaped acoustic source having flexible membranes extending across a cylindrical transducer containing a power source/electronics in liquid-filled voids and spaces.

These and other objects of the invention will become more readily apparent from the ensuing specification when taken in conjunction with the appended claims.

Accordingly, the present invention is a multi-port projector of acoustic energy in water that includes a cylindrical hollow transducer having annular ends around an opening. A thin, flexible member is secured to each annular end to extend across each opening to be displaced by the transducer. The transducer and flexible members form an interior that is sealed from ambient water. The thin flexible members can be either thin, disc-shaped flexible membranes or thin disc-shaped plates. A battery/electronics module is in the interior and is spaced from the transducer and flexible members to couple driving signals to the transducer for reciprocally displacing it and the flexible members in response to the driving signals.

An inert liquid fills the interior around the module, and an open truss on each annular end exposes the flexible members to the ambient water. Cylindrical portions coaxially extending with the transducer on a common longitudinal axis are connected to the open trusses for projecting acoustic energy of a lower frequency than conventional cylindrical transducers of similar size.

The battery/electronics module includes a battery section and an electronics section to couple the driving signals to the transducer. The electronics section has a case containing electronic components, and the inert liquid fills voids around the components in the case. A duct extends from the battery section to the ambient water to flood the battery section thereby activating seawater batteries in the battery section.

BRIEF DESCRIPTION OF THE DRAWINGS

A more complete understanding of the invention and many of the attendant advantages thereto will be readily appreciated as it becomes better understood by reference to the following detailed description when considered in conjunction with the accompanying drawings wherein like reference numerals refer to like parts and wherein.

DESCRIPTION OF THE PREFERRED EMBODIMENTS

Figures 1, 2:
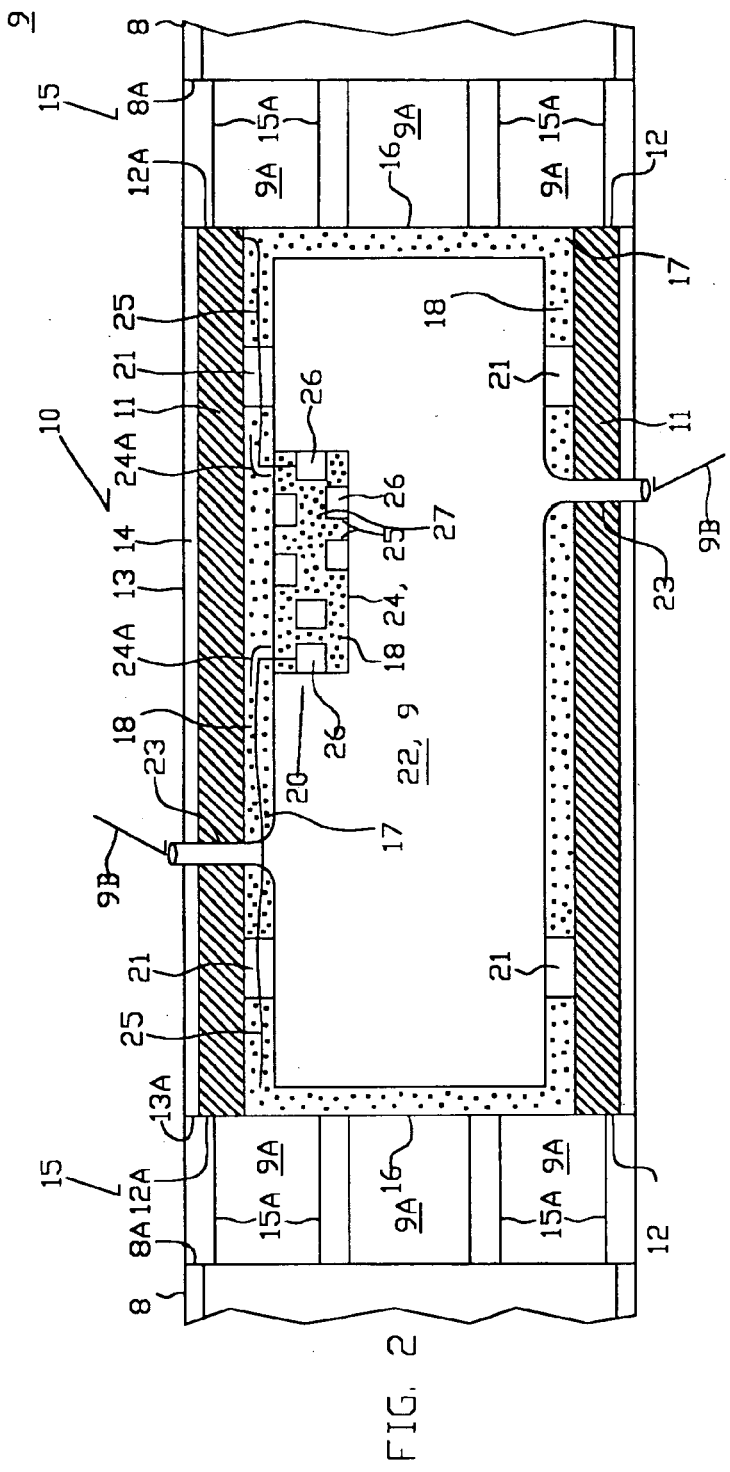
FIG. 1 is a schematic showing of a low frequency sonar multi-port projector of the invention in an allotted space in a countermeasure device.
FIG. 2 is a schematic cross-sectional showing of the low frequency sonar multi-port projector of the invention.

Referring to the FIGS. 1 and 2 there is illustrated a multi-port projector 10 of acoustic energy of the invention is included as a part of an elongate cylinder-shaped countermeasure device 4. Countermeasure device 4 has a diameter of only a few inches allowing it to be fitted into an individual launch tube of a compact launcher system (not shown) for deployment into seawater 9.

Multi-port projector 10 has a diameter of only a few inches and is substantially the same diameter as cylindrical-shaped portions 7 of countermeasures device 4 so that it can be securely fitted between cylindrical-shaped portions 7. Cylindrical-shaped portions 7 coaxially extend in opposite directions from multi-port projector 10 in allotted space 5 along a common longitudinal axis 6. Cylindrical-shaped portions 7 can have sensors/instrumentation, guidance/propulsion, electronics, and/or ordnance, etc. in rigid shells 8 on each portion 7 to perform other tactical functions of countermeasures device 4.

Multi-port projector 10 is a cylindrical projector of acoustic energy having an elongate cylindrical hollow magnetostrictive, or piezoelectric transducer 11. Transducer 11 can have a thin, strong metal or plastic shell 13 (for protection from abuses and watertight integrity) that is slightly separated from transducer 11 by a thin layer 14 of electrical insulation. Protective shell 13 could also be a watertight layer or coating of rugged, flexible insulation material bonded onto transducer 11 or insulation layer 14 that will withstand the rigors of handling and deployment yet will flex as transducer 11 is displaced. Shell 13 seals out or is impervious to ambient water 9 over expected depths of operation. Transducer 11 with shell 13 can be considered the hull portion of multi-port projector 10 of countermeasures device 4. Transducer 11 (and shell 13) can be connected at its opposite annular ends 12 (and end 13A of shell 13) to an open truss 15 of rigid members 15A that extend through portions 9A of ambient seawater 9. Each truss 15 is also secured at its opposite end to one end 8A of rigid shells 8 of cylindrical portions 7. Trusses 15 can sandwich circumferential annular strips of flexible members 16 between them and annular ends 12 & ends 13A of shell 13.

Cylindrical hollow magnetostrictive transducer 11 can be any of many well know designs that can have stacked ring-shaped magnetostrictive portions interleaved with serial or parallel connected electrodes. The exact construction and interconnection need not be further elaborated on or shown to avoid unnecessary detail concerning what is of general knowledge in the art. For purposes of demonstration of this inventive concept, however, a single electrode 12A at opposite ends of transducer 11 is shown to be suitably attached and interconnected to create and impart responsive longitudinal reciprocal displacements thereof along the longitudinal axis 6 of countermeasures device 4 in accordance with or in response to applied driving signals (shown as arrows 24A). Optionally, transducer 11 could be polarized to impart responsive reciprocal radial displacements if desired.

A very thin and flexible disc-shaped member 16 such as a thin membrane or thin disc-shaped plate is disposed on each annular opposite end 12 of transducer 11 to radially inwardly extend across it. Flexible members 16 are connected or secured to annular ends 12 of transducer 11 in a sealed relationship and can be connected directly to annular opposite ends 12 and protective shell 13 by a wide variety of well known means, such as for example, by a commercially available heavy duty epoxy-like bonding agent. Flexible members 16 are thin with respect to the wavelengths of interest, which in this case are the projected low-frequency signals. Since thin flexible members 16 will flex so freely, to the cylindrical multi-port projector 10 it appears as if there are no end plates. Consequently, this construct creates multiple ports for multi-port projector 10, and the cylinder-shaped structure of transducer 11 of multi-port projector 10 with cylindrical-shaped portions 7 becomes, or is the hull of, countermeasure device 4. Transducer 11 (and shell 13) can be connected at its opposite annular ends 12 (and end 13A of shell 13) to an open truss 15 of rigid members 15A that extend through portions 9A of ambient seawater 9. Each truss 15 is also secured at its opposite end to one end 8A of rigid shells 8 of cylindrical portions 7. Trusses 15 can sandwich circumferential annular strips of flexible members 16 between them and annular ends 12 & ends 13A of shell 13.

A battery/electronics module 20 can be held in a position spaced away inwardly from transducer 11 and thin end plates 12 by resilient members 21 inside of hollow transducer 11. Being so resilient, or compliant, resilient members 21 do not overly restrict or compromise the reciprocal excursions of transducer 11 as low-frequency acoustic signals are created and transmitted from multi-port projector 10 of countermeasures device 4. A battery section 22 of battery/electronics module 20 provides sufficient electrical power for an interconnected electronics section 24 of battery/electronics module 20 to enable electronics section 24 to generate predetermined driving signals 24A for transducer 11.

Multi-port projector 10 has an interior 17 that is enclosed by transducer 11 and thin end plates 16 and contains battery/electronics module 20. The part of interior 17 that is not filled by battery/electronics module 20 is filled completely with an inert liquid 18 such as a high-purity isoparaffinic solvent with a narrow boiling range. In the preferred embodiment, inert liquid 18 would be the trademarked solvent. ISOPAR produced by Exxon Mobil Corporation 3625 Gallow Road, Fairfax, Va. 22037. Because the volume of interior 17 that is outside of battery/electronics module 20 is filled completely with inert liquid 18, a lower-frequency projection of acoustic energy is created.

The inside of a case 25 containing electronic components 26 of electronics section 24 of battery/electronics module 20 may have small air-filled spaces or voids 27 around components 26. Inert liquid 18 is used to fill spaces 27 to further improve performance of multi-port projector 10. Since battery section 22 is most likely to be a seawater battery, some of the ambient seawater (shown as arrows 9B) can flow into the seawater battery of battery section 22 through a pair of sealed resilient ducts 23 extending through transducer 11 or other convenient transition points while multi-port projector 10 sinks in water 9. Ducts 23 allow flooding and filling of battery section 22 with some of ambient seawater 9 for ensuing activation of battery section 22. Battery section 22 could also be a sealed structure and does not need to be flooded or activated with a part of ambient seawater 9; however, such a structure may be more susceptible to the problems associated with overheating than a seawater battery.

Electronics section 24 has leads 25 coupled to connect driving signals 24A to annular electrodes 12A at opposite annular ends of transducer 11 and create responsive reciprocating displacements of transducer 11 and impart responsive reciprocating displacements of thin flexible members 16. The reciprocating displacements of transducer 11 transmit representative acoustic signals at opposite ends of multi-port projector 10 via thin, flexible members 16 that radiate to open water 9 through portions 9A of water 9 in both open trusses 15. The reciprocating displacements of transducer 11 also transmit the same representative acoustic signals at opposite ends of multi-port projector 10 through the rigid members 15A of both trusses 15 to both rigid shells 8 of cylindrical portions 7 that radiate into open water 9. In other words, the entire hull of the countermeasure device 4 that includes multi-port projector 10 connected by trusses 15 to cylindrical portions 7 will become a large multi-port transducer that will operate at much lower frequency than a conventional cylindrical transducer of the same size.

Multi-port projector 10 of the invention projects acoustic energy at about one half the lowest frequency of a comparably dimensioned contemporary transducer partially because it is liquid-backed. That is, multi-port projector 10 is filled with inert liquid 18 in interior 17 around battery/electronics module 20, is filled with inert liquid 18 around components 26 in case 25 of electronics section 24, and substantially filled with seawater in its battery section 22. This also provides the added operational advantage of heat dissipation. Furthermore, 1.) making transducer 11 and battery section 22 essentially the same length as multi-port projector 10, 2.) having liquid 18 filling the surrounding battery/electronics module 20 directly against the inside of transducer 11, and 3.) having transducer 11 covered or capped by thin flexible members 16 exposed to seawater 9 via open trusses 15 at opposite ends, assures excitation of countermeasure device 4 and projection of acoustic energy at the lower frequencies desired.

It is understood that multi-port projector 10 could be made in accordance with this invention in different sizes in different acoustic systems for many different purposes where lower frequency operation is needed. Other transducers such D.C. linear motors could be used instead of magnetostrictive elements and different arrangements of batteries and electronics could be used without departing from the scope of this invention herein described. Having this disclosure in mind, selection of suitable components from among many proven contemporary designs and compactly interfacing them as disclosed herein can be readily done without requiring anything beyond ordinary skill.

The components and their arrangements as disclosed herein all contribute to the novel features of this invention. Multi-port projector 10 of this invention provides a reliable and cost-effective means to improve the low-frequency response of countermeasures. Therefore, multi-port projector 10 as disclosed herein is not to be construed as limiting, but rather, is intended to be demonstrative of this inventive concept.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A multi-port projector of acoustic energy in water comprising:

a cylindrical hollow transducer having open annular ends;

a thin flexible member secured to each open annular end to extend across each opening, said cylindrical hollow transducer and said thin flexible members defining an interior sealed from ambient water;

a battery/electronics module positioned in said interior and electrically joined to said cylindrical hollow transducer, said module coupling driving signals to said cylindrical hollow transducer for reciprocally displacing said cylindrical hollow transducer and said thin flexible members in response to driving signals;

a liquid filling said interior around said battery/electronics module, said liquid having dielectric characteristics and being chemically inert; and an open truss on each open annular end wherein said thin flexible members are exposed to ambient water.

2. The projector of claim 1 further comprising:

a cylindrical portion connected to each open truss, wherein said cylindrical portion is axially coextensive.

3. The projector of claim 2 wherein said battery/electronics module further comprises:

a battery section; and an electronics section joined to said battery section to couple said driving signals to said cylindrical hollow transducer.

4. The projector of claim 3 further comprising:

a case surrounding said electronics section wherein said inert liquid fills voids in said case.

5. The projector of claim 3 wherein said battery section comprises a seawater battery.

6. The projector of claim 4 further comprising:

a duct extending from said battery section to said ambient water to flood said battery section and activate said seawater battery.

7. The projector of claim 6 further comprising:

a shell surrounding the exterior of said cylindrical hollow transducer.

8. The projector of claim 7 wherein said cylindrical hollow transducer and said cylindrical portions connected to said open trusses are coextensively aligned on a common longitudinal axis and have substantially the same diameter.

9. The projector of claim 8 wherein said thin flexible members are disc-shaped flexible membranes.

10. The projector of claim 8 wherein said thin flexible members are disc-shaped plates.

* * * * *